United States Patent [19]

Finneman

[11] 3,817,471
[45] June 18, 1974

[54] LINE HOLDER

[76] Inventor: Tyko K. Finneman, 3226 S. E. 25th Ave., Portland, Oreg. 97201

[22] Filed: May 15, 1972

[21] Appl. No.: 253,542

[52] U.S. Cl. .............................................. 242/85.1
[51] Int. Cl. .............................................. B65h 75/06
[58] Field of Search ...... 242/85.1, 96, 125.1, 125.3, 242/104; 24/125.1, 125.3, 129 B, 130; 191/12.2 R

[56] References Cited
UNITED STATES PATENTS

| | | | |
|---|---|---|---|
| 278,097 | 5/1883 | Collins | 24/129 B |
| 1,634,436 | 7/1927 | Polson | 242/85.1 |
| 2,204,939 | 6/1940 | Lyons | 242/85.1 X |
| 2,683,937 | 7/1954 | Criswell | 242/85.1 X |
| 3,675,276 | 7/1972 | Nuse | 24/129 B |

FOREIGN PATENTS OR APPLICATIONS

| | | | |
|---|---|---|---|
| 242,426 | 9/1965 | Austria | 242/104 |

Primary Examiner—John W. Huckert
Assistant Examiner—Edward J. McCarthy
Attorney, Agent, or Firm—Eugene M. Eckelman

[57] ABSTRACT

A line holder capable of holding a supply of line and including structure in which a portion of the line is adapted to be engaged to accomplish novel manipulation of the line and the holder. In particular, the holder has end indentations around which the line is wrapped and also has a pair of angled notches on one side which are of minimum width relative to the diameter of the line so that when the line is forced thereinto it is anchored against longitudinal movement. The two notches lead from the outer edge at an angle directed toward respective adjacent ends of the holder. The other side edge of the holder has a pair of notches extending in at substantially right angles to said side edges which terminate in openings slightly larger than the line, thus allowing the line when fully inserted to move longitudinally therethrough.

2 Claims, 6 Drawing Figures

PATENTED JUN 18 1974 3,817,471

LINE HOLDER

BACKGROUND OF THE INVENTION

This invention relates to new and useful improvements in line holders.

Various types of line holders have heretofore been proposed for holding a supply of line. It is often desired that the line holder be used in combination with the line in accomplishing various functions such as for holding one end of the line or for lengthening or shortening the line during usage of the latter. One proposed use of a line holder is in conjunction with the plumb bob, as illustrated by U.S. Pat. No. 2,683,937. This line holder as used with a plumb bob and other line holders are deficient since they do not provide a desired combination of features wherein a line on the holder is capable of being manipulated to perform a number of useful operations in combination with the holder.

SUMMARY OF THE INVENTION

According to the invention and forming a primary objective thereof, there is provided a line holder having a novel structural arrangement facilitating easy wrapping of the line thereon or unwrapping of the line therefrom and also including holding notch portions in which the line may be anchored when desired, and also including guide notch portions in which the line is confined but is capable of sliding movement through the holder, such notch portions allowing the line to be manipulated in combination with the holder in a plurality of novel functions.

Still another object is to provide a line holder of the type described having a central bore of novel arrangement for receiving a spindle on which the holder may be rotated.

The invention will be better understood and additional objects and advantages will become apparent from the following description taken in connection with the accompanying drawings which illustrate a preferred form of the device.

DETAILED DESCRIPTION OF A PREFERRED EMBODIMENT

Figure 1:
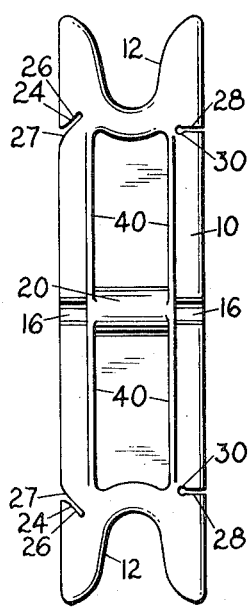
FIG. 1 is a plan view of a line holder embodying features of the present invention.
Figure 2:
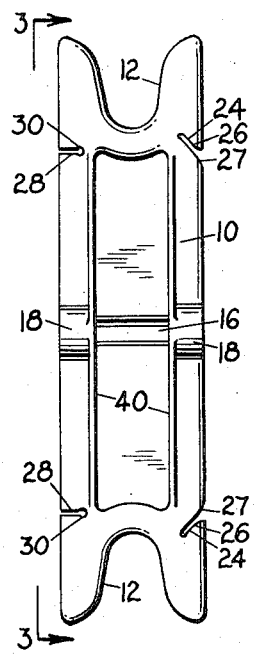
FIG. 2 is a plan view of the other side of the holder.
Figure 3:
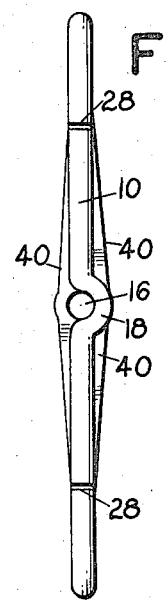
FIG. 3 is a side edge view taken on the line 3—3 of FIG. 2.
Figure 4:
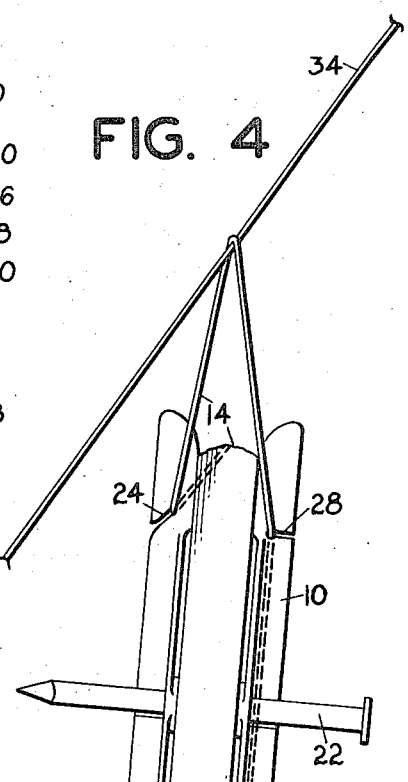
FIGS. 4, 5 and 6 show various uses of the present line holder.
Figures 5, 6:
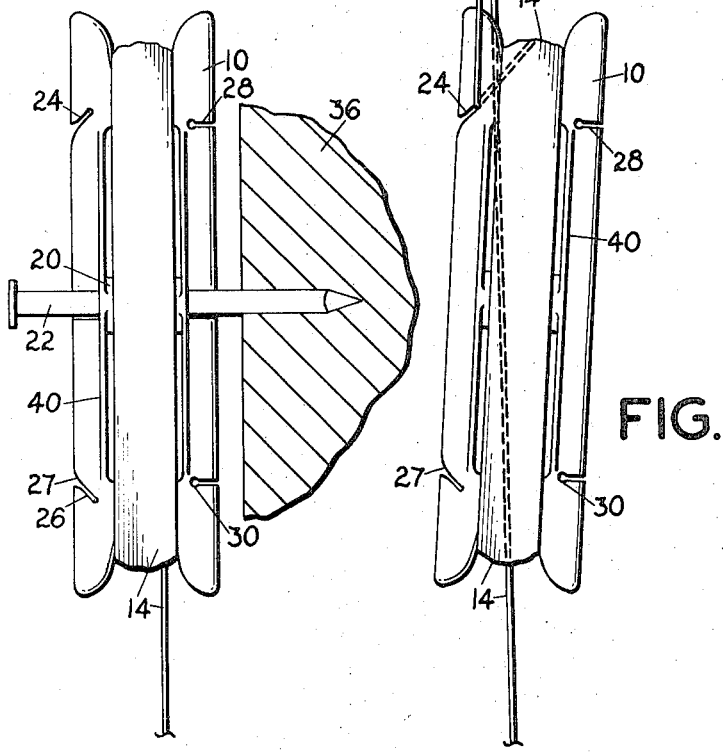

Referring in particular to the drawings, the line holder of the present invention comprises a body member 10 which is of flat, plate-like construction having end indentations 12 for receiving line 14, FIGS. 4, 5 and 6, wrapped lengthwise around the body member in said indentations. It is preferred that the body member 10 be of a size which makes it convenient for a person to carry the holder in a pocket and that its edges be rounded so as not to damage the clothing or harm the person.

Disposed laterally of the body member 10 centrally between the ends is a spindle-receiving opening 16 defined by partial width, semi-circular side portions 18 curved in one direction and a partial width semi-circular center portion 20 curved in the opposite direction. Opening 16 is adapted to removably receive a spindle 22, FIG. 5, such as a nail. Support of the body member 10 on a spindle 22 provides fast unwinding of line on the holder.

One side edge of the body member 10 has a pair of holding notches 24 which are located toward respective ends of the body member and which lead inwardly toward said respective ends at an obtuse angle relative to the laterally extending opening 16. Each of the notches 24 is of a slightly reduced width relative to the diameter of the line whereby the line is arranged to be frictionally anchored therein. The notches 24 intermediate their ends have an even smaller portion or throat 26 through which the line must be passed with even greater frictional force in order that it will remain bottomed in the notches without much possibility of accidental displacement. The line snaps through the throat 26 as it bottoms in the notches 24. The outlets of the openings 24 at the edges widen out in mouth portions 27 to facilitate easy insertion of the line in the notches 24.

The opposite side edge of the body member 10 from the side which contains the notches 24 has a pair of guide notches 28. Notches 28, similar to notches 24, are disposed toward the ends of the body member. These notches, however, lead straight in or at substantially right angles to the edge of the body member and have a width only slightly less than the diameter of the line so that the line while being easily forced therethrough will not generally be accidentally displaced. The notches 28 terminate at their inner ends in enlarged portions 30 whereby the line when bottomed in the notches can be readily pulled therethrough.

The present line holder has many important functions of use. Of course, it holds a quantity of line for many uses. Also, as viewed in FIG. 4, the line holder can be used with a plumb bob 32 for providing a support for the plumb bob and also providing vertically adjusting means for the plumb bob. In this use, a portion of the line is unwound from the holder and is anchored in one of the notches 24. The line then extends over a support 34, such as a building line wire, and is then threaded down through both notches 28, the line being disposed in the enlarged portions 30 of notches 28 so as to be slidable therein. The end of the line 14 is attached to the plumb bob 32, and by such arrangement the holder is suspended in the air. This arrangement allows vertical adjustment of the plumb bob in that by moving the holder up or down the line will slide through the openings 30 and over the support 34. It is thus convenient for a workman to support a plumb bob in a raised position while he is readying the work to be aligned, and when he desires to check his work, the plumb bob can be lowered by sliding the holder up on the line. It is preferred that a braided line be used to prevent twisting.

The holder may be rotatably mounted on a spindle 22 hammered into a vertical support 36, FIG. 5. In this latter case, if it is desired that the holder be non-rotatable, a portion of the free end of the line can be wrapped a few times around the spindle 22.

The holder can also be used as a weight on the end of the line, FIG. 6, for throwing the line over a support member 34, the line 14 being anchored at a suitable point in a notch 24 and will not unwind when thrown.

Body member 10 has longitudinal ribs 40 extending from adjacent the ends thereof to the semi-circular portions 18 and 20. These ribs, together with the opposed extension of semi-circular portions 18 and 20, provide a reinforced structure.

It is to be understood that the forms of my invention herein shown and described are to be taken as preferred examples of the same and that various changes in the shape, size and arrangement of parts may be resorted to without departing from the spirit of my invention.

Having thus described my invention, I claim:

1. A line holder comprising a flat body member having opposite side and opposite end edges as well as opposite faces, means defining indentations in said end edges for holding line wrapped endwise around said holder over said faces, means in one side edge of said body member defining a pair of holding notches arranged to receive and frictionally hold a line therein, said notches being disposed adjacent to respective ends and angled in toward said respective ends, means in the other side edge of said body member defining a pair of guide notches disposed in spaced relation from each other, said guide notches having a reduced dimension portion leading in from said side edge to restrict free lateral movement of line therethrough and having an enlarged portion inwardly thereof to allow free sliding movement of line therethrough, and means intermediate the opposite end edges defining a transverse opening across said body member arranged to receive a spindle for rotating said body member thereon.

2. The line holder of claim 1 wherein said opening is defined by a semi-circular portion extending partly across said body member in one direction and a semi-circular portion extending partly across said body member in the opposite direction, and also including longitudinal reinforcing ribs leading from a point adjacent to the ends of said body member to said semi-circular portions.

* * * * *